(12) United States Patent
Cui et al.

(10) Patent No.: US 11,168,403 B2
(45) Date of Patent: Nov. 9, 2021

(54) HIGH-EFFICIENCY OXYGEN REDUCTION TO HYDROGEN PEROXIDE CATALYZED BY OXIDIZED CARBON MATERIALS

(71) Applicant: The Board of Trustees of the Leland Stanford Junior University, Stanford, CA (US)

(72) Inventors: Yi Cui, Stanford, CA (US); Zhiyi Lu, Sunnyvale, CA (US); Guangxu Chen, Menlo Park, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 46 days.

(21) Appl. No.: 16/221,122

(22) Filed: Dec. 14, 2018

(65) Prior Publication Data
US 2019/0186024 A1      Jun. 20, 2019

Related U.S. Application Data

(60) Provisional application No. 62/599,360, filed on Dec. 15, 2017.

(51) Int. Cl.
*C25B 1/30*      (2006.01)
*C25B 11/075*    (2021.01)
(Continued)

(52) U.S. Cl.
CPC .............. *C25B 1/30* (2013.01); *B01J 21/185* (2013.01); *B01J 35/0033* (2013.01); *B01J 37/12* (2013.01); *C25B 9/65* (2021.01); *C25B 11/075* (2021.01)

(58) Field of Classification Search
CPC . C25B 1/30; C01B 15/01; C01B 15/022–024; C01B 15/026;
(Continued)

(56) References Cited

U.S. PATENT DOCUMENTS

| 4,430,176 A * | 2/1984 | Davison | ................... | C25B 9/08 |
| | | | | 204/284 |
| 6,712,949 B2 | 3/2004 | Gopal | | |

(Continued)

FOREIGN PATENT DOCUMENTS

| CN | 107313068 A | 11/2017 |
| GB | 2513103 | 10/2014 |

(Continued)

OTHER PUBLICATIONS

Datsyuk, Vitaliy & Kalyva, M. & Papagelis, Konstantinos & Parthenios, John & Tasis, D. & Siokou, Angeliki Elina & Kallitsis, Joannis & Galiotis, Costas. (Feb. 2008). Chemical Oxidation of Multi-Walled Carbon Nanotubes. Carbon. 46. 833-840. (Year: 2008).*

(Continued)

*Primary Examiner* — Salil Jain
(74) *Attorney, Agent, or Firm* — Sheppard Mullin Richter & Hampton LLP (57) ABSTRACT

Improved electrochemical production of hydrogen peroxide is provided with a surface-oxidized carbon catalyst. The carbon can be, for example, carbon black or carbon nanotubes. The oxidation of the carbon can be performed, for example, by heating the carbon in nitric acid, or by heating the carbon in a base. The resulting carbon catalyst can have a distinctive oxygen is peak in its X-ray photoelectron spectrum.

6 Claims, 7 Drawing Sheets

(51) Int. Cl.
  *B01J 21/18* (2006.01)
  *B01J 37/12* (2006.01)
  *C25B 9/65* (2021.01)
  *B01J 35/00* (2006.01)

(58) Field of Classification Search
  CPC . C01B 15/027; C01B 15/0275; C01B 15/029;
       C01B 15/0295; B01J 21/18; B01J 21/185
  See application file for complete search history.

(56) References Cited

U.S. PATENT DOCUMENTS

| | | |
|---|---|---|
| 7,892,408 B2 | 2/2011 | Rhodes |
| 2001/0022290 A1* | 9/2001 | Shiota ............... B01J 37/0205 |
| | | 210/749 |
| 2003/0019758 A1 | 1/2003 | Gopal |
| 2012/0058889 A1 | 3/2012 | Nishino |
| 2013/0330559 A1* | 12/2013 | Hellstrom ............ G06F 30/20 |
| | | 428/408 |
| 2017/0226647 A1* | 8/2017 | Benetton ................ C25B 1/30 |

FOREIGN PATENT DOCUMENTS

| | | |
|---|---|---|
| JP | 5470833 B2 | 4/2014 |
| KR | 20140073180 A * | 6/2014 |
| KR | 20160101402 A * | 8/2016 |
| WO | 2012114108 A1 | 8/2012 |
| WO | WO2018/075483 | 4/2018 |

OTHER PUBLICATIONS

Pandiyan et al., "Correlation of sp2 carbon bonds content in magnetron-sputtered amorphous carbon films to their electrochemical H2O2 production for water decontamination applications", 2015, Carbon v94, pp. 988-995.

Li et al., "A novel carbon black graphite hybrid air-cathode for efficient hydrogen peroxide production in bioelectrochemical systems", 2016, Journal of Power Sources v306, pp. 495-502.

Reiche et al., "Reactivity of mesoporous carbon against water—an in-situ XPS study", 2014, Carbon v77, pp. 175-183.

Extended European Search Report for EP Application No. 18889643.5 dated Jul. 26, 2021, 7 pages.

* cited by examiner

HIGH-EFFICIENCY OXYGEN REDUCTION TO HYDROGEN PEROXIDE CATALYZED BY OXIDIZED CARBON MATERIALS

CROSS REFERENCE TO RELATED APPLICATIONS

This application claims the benefit of U.S. provisional patent application 62/599,360, filed on Dec. 15, 2017, and hereby incorporated by reference in its entirety.

GOVERNMENT SPONSORSHIP

This invention was made with Government support under contract DE-AC02-765 F00515 awarded by the Department of Energy. The Government has certain rights in the invention.

FIELD OF THE INVENTION

This invention relates to the electrochemical production of hydrogen peroxide.

BACKGROUND

Production of hydrogen peroxide ($H_2O_2$) is an important industrial process, because $H_2O_2$ is a widely used chemical with many applications. Currently, the industrial synthesis of $H_2O_2$ involves an energy intensive anthraquinone process, which requires large-scale and complex infrastructure. Electrochemical synthesis of $H_2O_2$ from oxygen reduction in aqueous media offers an attractive alternative route for onsite applications such as water cleaning and sanitization. The efficiency of this process depends greatly on identifying cost-effective catalysts with high activity and selectivity.

SUMMARY

In this work, we demonstrate a facile and general approach to catalyst development via the surface oxidation of abundant carbon materials (e.g., carbon nanotubes) to significantly enhance both activity and selectivity (~90%) for $H_2O_2$ production by means of electrochemical oxygen reduction in aqueous media.

An exemplary embodiment include the following steps: provide a carbon material (e.g., carbon nanotubes), heat the carbon material while it is immersed in concentrated nitric acid to make it a catalyst, and use the resulting catalyst for the electrochemical production of $H_2O_2$ in aqueous media. Heating commercially available carbon materials in concentrated nitrate acid improves the activity and selectivity of electrochemical reduction of oxygen to hydrogen peroxide in aqueous media.

Significant advantages are provided: 1) The raw materials, such as carbon nanotubes and carbon nanoparticles, are commercially available; 2) The oxidation process, e.g. heating the raw materials in concentrated nitrate acid, is cost-effective; and 3) The oxidized carbon catalysts show a high activity and selectivity towards electrochemical reduction of oxygen to hydrogen peroxide in aqueous media.

DETAILED DESCRIPTION

I) Introduction

The enormous need of hydrogen peroxide ($H_2O_2$) places this chemical as one of the 100 most important chemicals in the world. $H_2O_2$ is a potential energy carrier and an environmentally friendly oxidant for various chemical industries and environmental remediation, thus the need for efficient and inexpensive $H_2O_2$ production is essential. The current industrial process for the synthesis of $H_2O_2$ involves an energy intensive anthraquinone oxidation/reduction, which requires complex and large-scale infrastructure and generates a substantial amount of waste chemicals. The direct synthesis of $H_2O_2$ from hydrogen ($H_2$) and oxygen ($O_2$) in the presence of catalysts provides a more straightforward route and ideally solves the issues associated with the indirect anthraquinone route. However, as the hydrogen/oxygen mixture is potentially explosive, studies have aimed to eliminate the danger of explosion and to simultaneously find selective and active catalysts. Another attractive and alternative route for the on-site direct production of $H_2O_2$ is through an electrochemical process in a fuel cell setup, where oxygen reduction undergoes a two-electron pathway in an oxygen reduction reaction (ORR). Substantial efforts in recent years on this fuel cell concept have aimed at efficiently generating electricity simultaneously with a high-yield production of $H_2O_2$.

Figure 1:
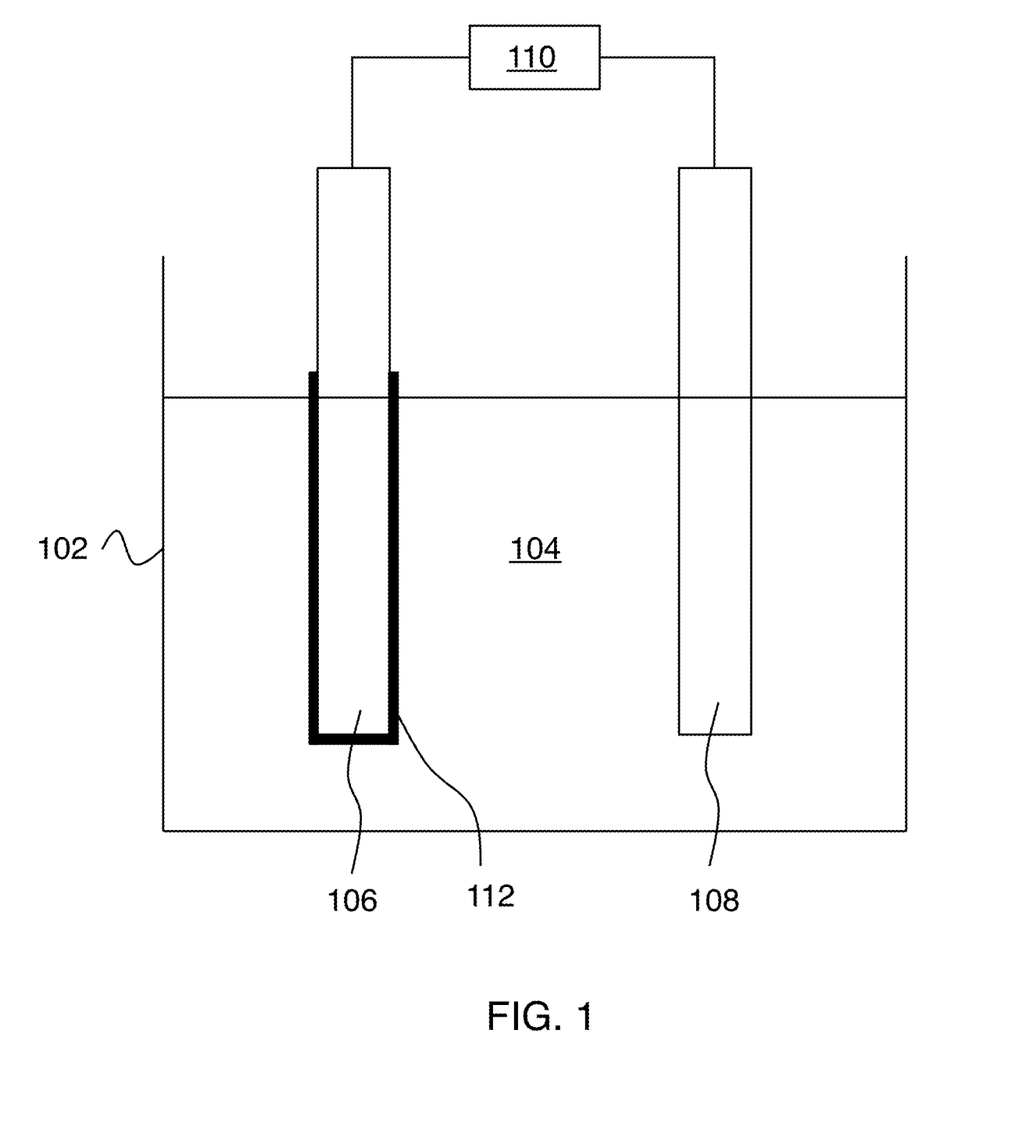
FIG. 1 shows an exemplary electrochemical cell.

FIG. 1 schematically shows this configuration. An electrochemical cell 102 includes a working electrode 106 where the reaction of interest takes place. In this case, the reaction of interest is production of hydrogen peroxide. Working electrode 106 and a counter electrode 108 are disposed in an electrolyte 104. Current is provided by an electrical source 110. A catalyst 112 is disposed on the working electrode 106. As described below, electrochemical cells can optionally include a third electrode, usually referred to as the reference electrode, but this is more commonly done in research instruments than in production.

For the two-electron route, electrocatalysts 112 with high activity and selectivity are a prerequisite. Noble metals and their alloys (e.g. Pd—Au, Pt—Hg and Pd—Hg) are currently the most efficient catalysts, requiring small overpotentials for oxygen reduction as well as high $H_2O_2$ selectivity (up to ~98%). However, the scarcity of noble metals may hinder their large-scale application. Carbon-based materials have shown great promise as alternate catalysts for the electrochemical synthesis of $H_2O_2$, as they are earth-abundant, highly tunable and electrochemically stable under reaction conditions. Recent studies demonstrate the capability of carbon materials for the electrochemical production of $H_2O_2$, with their performance strongly correlated to heteroatom doping and material structure, as both of these parameters can tailor the electronic structure of carbon atoms. Despite progress in this area, there is room for improvement in developing improved carbon-based materials, and much to learn regarding structure-activity relationships.

Herein, we demonstrate an effective approach to enhance both the activity and selectivity of carbon materials for $H_2O_2$ production by means of surface oxidation of the carbon catalyst. The carbon can be, for example, carbon black or carbon nanotubes. For example, after oxidizing commercially available carbon nanotubes (CNTs), we observe a significant decrease in overpotential and an enhanced selectivity up to ~90% in both basic and neutral media. Catalyst characterization reveals the existence of both C—O and C=O functional groups on the surface of the oxidized CNTs (O—CNTs). The ORR activity and selectivity are found to be positively correlated with the oxygen content, indicating the importance of oxygen functional groups. The general efficacy of this approach is demonstrated by observing a similarly enhanced oxygen reduction performance on another form of oxidized carbon, the carbon particles Super P® and acetylene black, denoted as O—SP and O-AB, respectively, which are much lower-cost than O—CNT. To elucidate the catalytic mechanism, we employ density functional theory (DFT) calculations to investigate the activities of a wide variety of oxygen functional groups and identify several possible sites with enhanced ORR activity. Moreover, guided by the DFT results, a series of experiments are performed to fabricate oxidized CNTs with prominent selectivity, which further supports the active sites of the oxidized carbon materials for electrochemical $H_2O_2$ synthesis.

II) Results

IIa) ORR activities of CNTs and O—CNTs

Figure 2A:
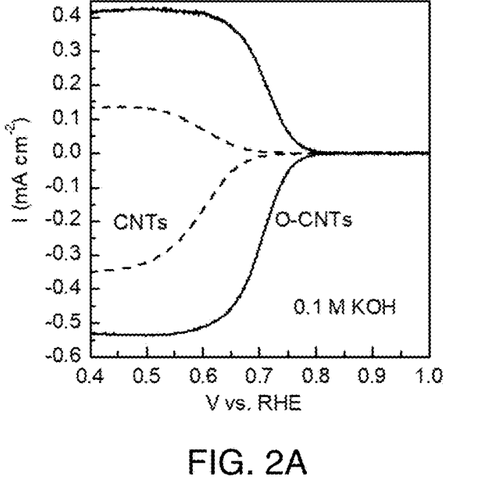
FIGS. 2A-F show experimental electrochemical characterization results relating to embodiments of the invention.
Figure 2B:
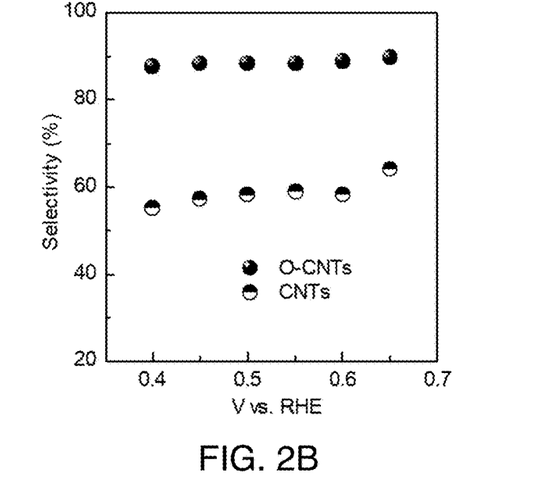

The O—CNTs were prepared by the chemical oxidation of CNTs using concentrated nitrate acid (see methods section for more details). The ORR performance was evaluated in an aqueous solution (0.1 M KOH or 0.1 M PBS) by using a rotating ring-disk electrode (RRDE) at 1600 rpm. The ORR can follow either of a 4e⁻ or 2e⁻ pathway, the latter is preferred in this study as the production of $H_2O_2$ is the objective. FIG. 2A shows electrochemical results in a basic electrolyte (0.1 M KOH, pH-13), the oxygen reduction currents measured on a disk electrode (solid lines) and the $H_2O_2$ oxidation currents measured on a ring electrode (dash lines). The amount of $H_2O_2$ formed was quantified by the ring electrode which was potentiostated at 1.2 V (vs RHE, the same below) to avoid ORR currents at the ring, allowing only $H_2O_2$ oxidation. According to the polarization curves, the O—CNTs showed a much higher current and a remarkably lower overpotential (~130 mV lower at 0.2 mA) with respect to the commercial CNTs. It should be noted that the current increased very fast to the limiting current for 0-CNTs, indicating fast ORR kinetics which was also reflected in the lower Tafel slope. This fast kinetics may afford the 0-CNTs as a promising candidate in alkaline fuel cells for the synthesis of $H_2O_2$. In addition to the higher activity, the O—CNTs exhibited a significantly higher $H_2O_2$ selectivity (around ~90% in the potential range of 0.4-0.65 V) than the CNTs (~60%), as shown in FIG. 2B.

Figure 2C:
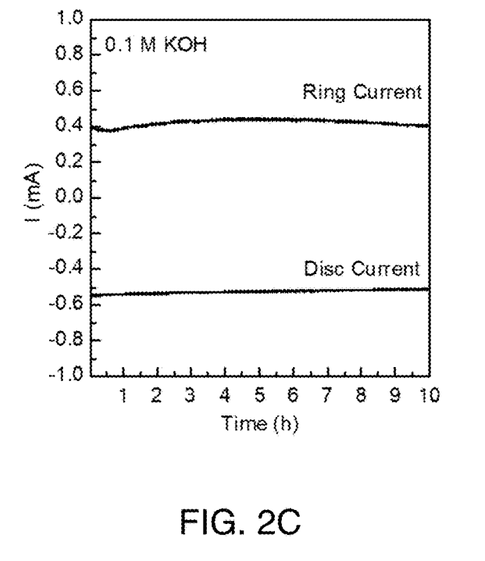
Figure 2D:
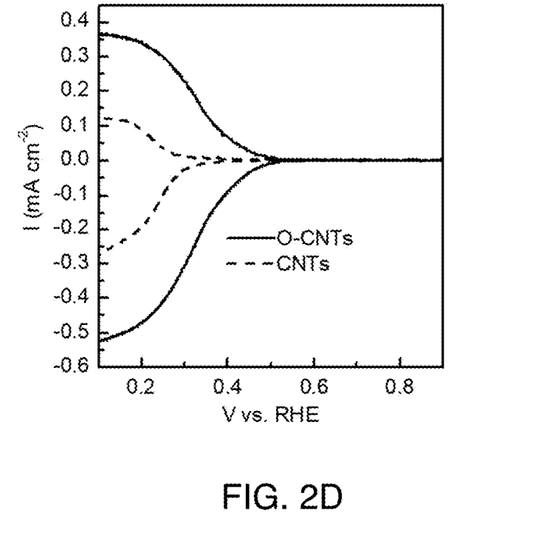
Figure 2E:
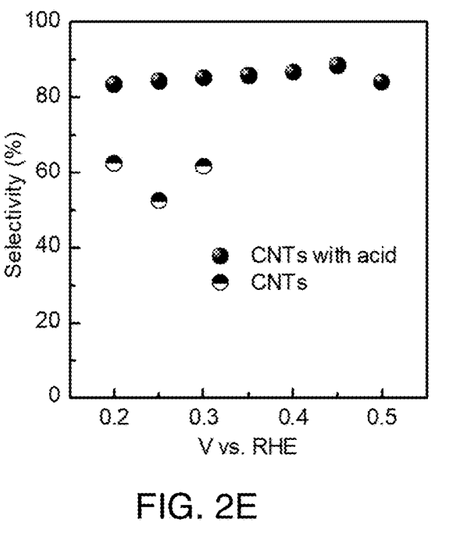
Figure 2F:
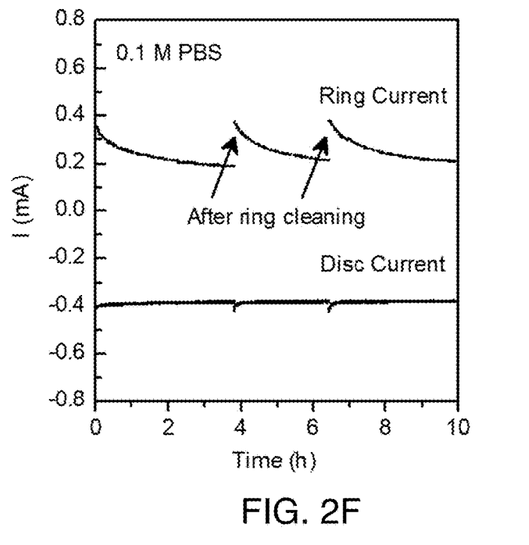

This performance enhancement was also observed in neutral electrolyte (pH ~7), where the onset potential measured at 0.05 mA shifted in a positive direction by ~150 mV and the selectivity increased from ~60% to ~85% for CNTs exposed to the oxidation treatment (FIGS. 2D-E). The stability of O—CNTs was demonstrated by long-term testing (~10 h) with negligible changes in activity or selectivity as measured on both the ring and disc electrodes (FIGS. 2C and 2F). The gradual degradation on the ring current in neutral electrolyte was attributed to anion poisoning rather than current efficiency degradation, as the ring current could be recovered after electrochemical ring cleaning. The ORR activity of O—CNTs was also evaluated in acid condition (0.1 M $HClO_4$). It is observed that the activity and selectivity are both significantly improved compared with CNTs, but not as good as those performed in base condition. These results indicate that the O—CNTs possess both higher activity and $H_2O_2$ selectivity than those of CNTs toward oxygen reduction to produce $H_2O_2$ in alkaline and neutral electrolytes.

Figure 5:
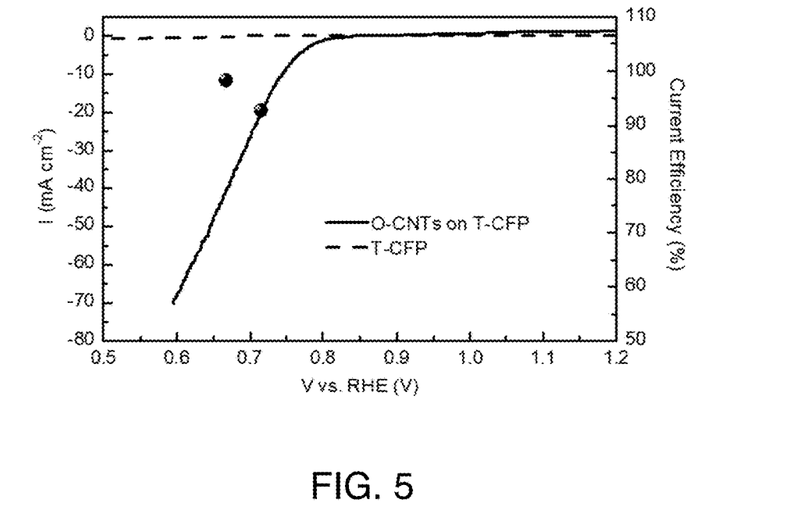
FIG. 5 shows polarization curves of Teflon coated carbon fiber paper with and without loading by oxidized carbon nanotubes.
Figure 6A:
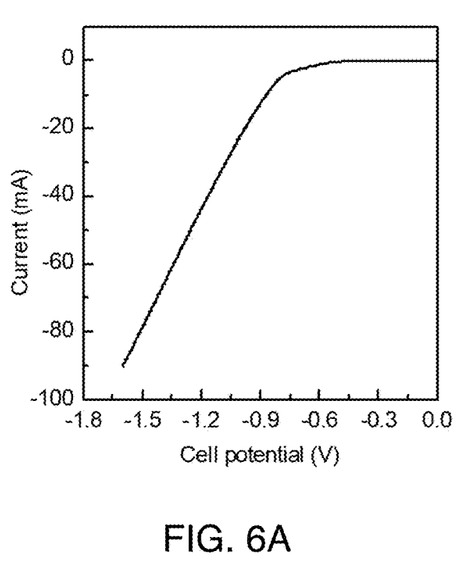
FIGS. 6A-B show a polarization curve (without IR compensation) and constant current (50 mA) V-t curve for production of $H_2O_2$ using oxidized carbon nanotubes as a catalyst.
Figure 6B:
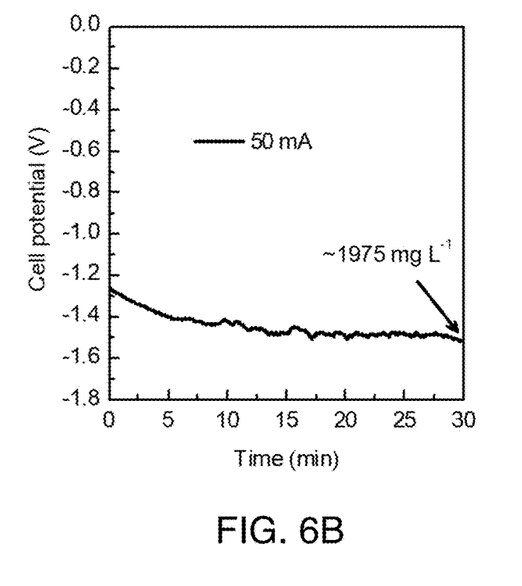

The high activity and selectivity of the O—CNT catalysts make it the most active non-precious electrocatalyst towards electrochemical reduction of oxygen to $H_2O_2$ in basic conditions. To improve the ORR current for practical applications, we loaded our catalyst onto Teflon-treated carbon fiber paper (T-CFP) with a loading of ~0.5 mg cm² and measured their steady-state polarization curves (FIG. 5). The T-CFP is highly hydrophobic, thus providing abundant three-phase contact points for the ORR. In 1 M KOH, the electrode achieved current densities of 20 and 40 mA cm⁻² at 0.72 and 0.68 V, respectively, while maintaining a similarly high selectivity of >90%. In addition, we performed the ORR performance of O—CNTs catalysts in a reactor reported previously and it is found that the $H_2O_2$ concentration can be easily accumulated to around 1975 mg·L⁻¹ within 30 min (the polarization curve and V-t curve under constant current of the reactor can be seen in FIGS. 6A and 6B, respectively). Compared with previous reports, the yield as well as production rate are still among the highest values, demonstrating that electrochemical reduction of oxygen to $H_2O_2$ is practical in an alkali environment.

IIb) Characterizations of CNTs and O—CNTs

Figure 3A:
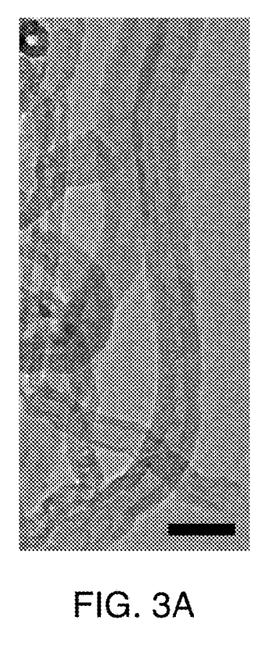
FIGS. 3A-E show experimental TEM and XPS characterization results relating to embodiments of the invention.
Figure 3B:
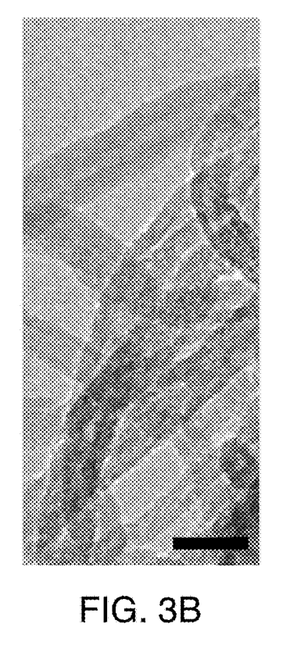
Figure 3C:
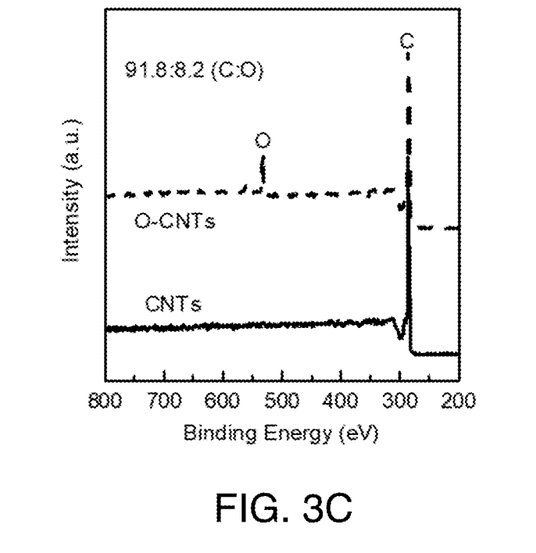
Figure 3D:
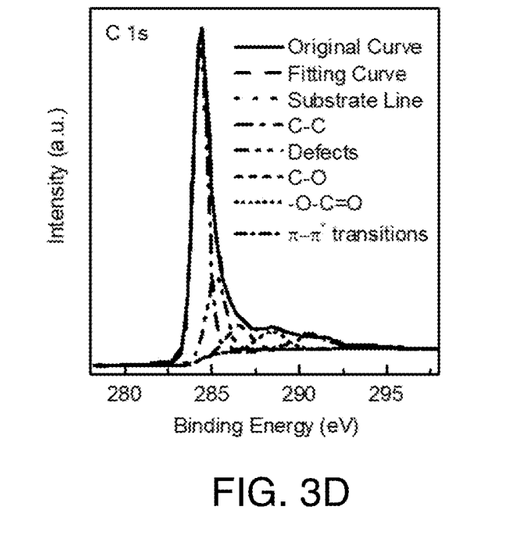
Figure 3E:
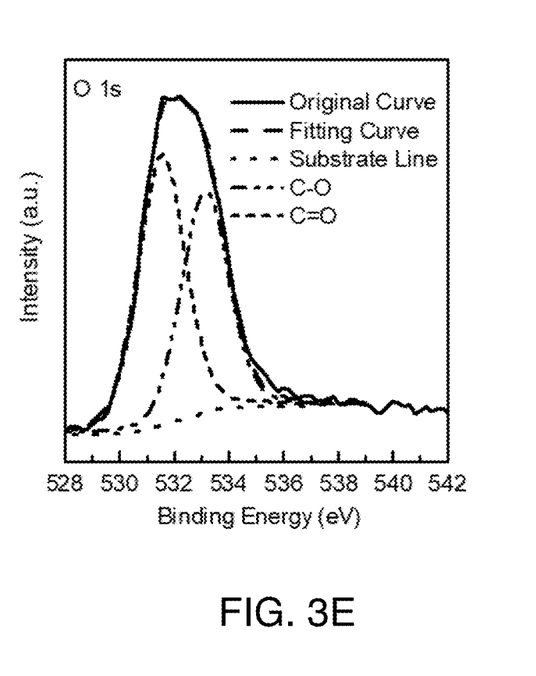

Physical and chemical characterization of the two samples may shed light on the origin of the performance enhancement. Transmission electron microscopy images (TEM, FIG. 3A (before oxidation) and 3B (after oxidation) and X-ray diffraction patterns demonstrate that the tube-like structure and the crystallinity were not affected by the oxidation process. Raman spectra of both samples reveal that the intensity ratio of D and G peaks (ID:IG) was slightly increased after oxidation, indicating that the oxidation process created some disorder (i.e. defect) in the graphitic structure. FIG. 3C depicts the XPS survey scans to detect the elements presented on the CNTs and O—CNTs surfaces. It is found that a new peak which can be indexed to O 1 s emerged after nitric acid treatment, yielding a carbon/oxygen ratio of 92:8, substantially different from the commercial CNTs which exhibited negligible oxygen content. The C is spectrum of the O—CNTs (FIG. 3D) can be deconvoluted into the following bands: carbon in graphite at 284.5 eV, defects (attributed to C atoms no longer in the regular tubular structure) at 285.4 eV, carbon singly bound to oxygen (C—O) at 286.1 eV, carbon bound to two oxygens (i.e., —COOH) at 288.7 eV, and the characteristic shakeup line of carbon in aromatic compounds at 290.5 eV (n–n*transition). The deconvolution of the O is spectrum (FIG. 3E) shows two peaks: oxygen doubly bound to carbon (C═O) at 531.6 eV and oxygen singly bound to carbon (C—O) at 533.2 eV. These results indicate that the oxidation treatment induced more oxygen containing functional groups (e.g. C—OH, C—O—C, C═O, C—OOH, consistent with FT-IR results (not shown)), accompanied by a slightly more disordered structure for the oxidized CNTs.

Additional control experiments were performed to identify the main reason for enhanced performance. The commercial CNTs usually incorporate iron-based catalysts, which may contribute to the ORR activity and selectivity. Thus, we determined the Fe concentrations of the catalysts by Inductively coupled plasma mass spectrometry (ICP-MS). The results demonstrated that the Fe in CNTs can be removed by the oxidation treatment. It also shows that the Fe concentration in commercial carbon nanoparticles (e.g. Super P®, denoted as "SP") is one-magnitude less than that in CNTs. However, as the ORR activity and selectivity of SP are both similar to those of CNTs (as described below), we believe that the small amount of Fe may not play a vital role in determining the ORR performance. Moreover, in terms of the trace amount of Fe in SP and oxidized SP (O—SP) and the greatly enhanced ORR performance (especially the onset potential) for O—SP, we can conclude that the presence of iron nanoparticles did not contribute substantially to ORR performance. Moreover, to mitigate the possible contribution from the iron, the commercial CNTs were first treated with concentrated HCl and NaSCN solution before performing ORR measurements. Electrochemical results demonstrated that the CNTs showed slightly enhanced ORR activity and $H_2O_2$ selectivity before and after HCl and NaSCN treatment, further supporting our conclusion.

It has been reported that the defects in the carbon materials may act as reactive sites for oxygen adsorption or reduction during the electrocatalytic process. Here in this case, the O—CNTs were further treated in a mixed $H_2$/Ar atmosphere to reduce the oxygen containing functional group (R—O—CNTs). XPS data reveals that this $H_2$ reduction process removed most of the oxygen while the R—O—CNT structure still retains defects, as shown in the Raman spectrum. However, in terms of the ORR activity and selectivity, the R—O—CNTs is far worse than O—CNTs, indicating oxygenated defects play an important role in these catalysts, e.g. as active sites themselves or by affecting the electronic structure of the material.

IIc) ORR Activities of Carbon Nanoparticles and Oxidized Carbon Nanoparticles

Figure 4A:
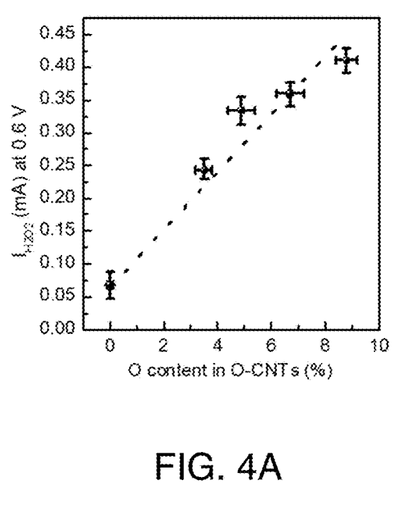
FIGS. 4A-B show the effect of catalyst oxygen concentration on $H_2O_2$ current and selectivity of hydrogen peroxide production.
Figure 4B:
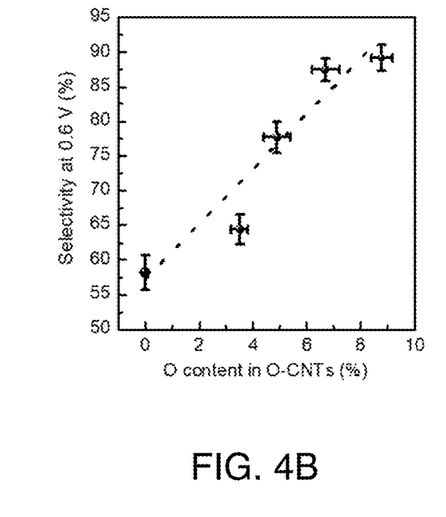
Figure 4C:
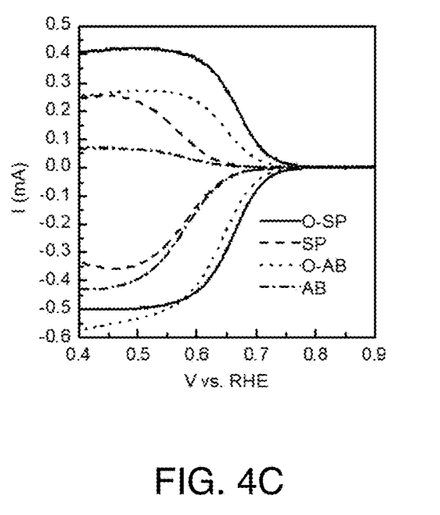
FIGS. 4C-D show polarization curves and $H_2O_2$ current for various carbon materials and their oxidized derivatives.
Figure 4D:
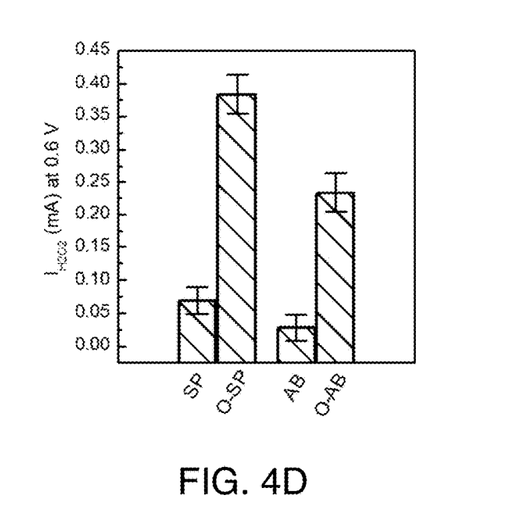
Figure 7A:
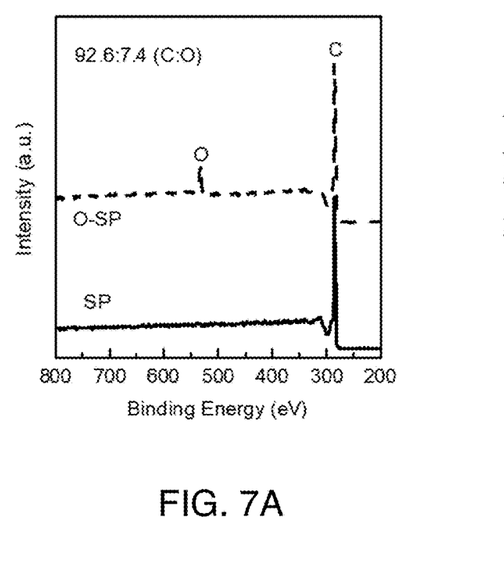
FIG. 7A shows XPS spectra of oxidized and non-oxidized SP carbon.
Figure 7B:
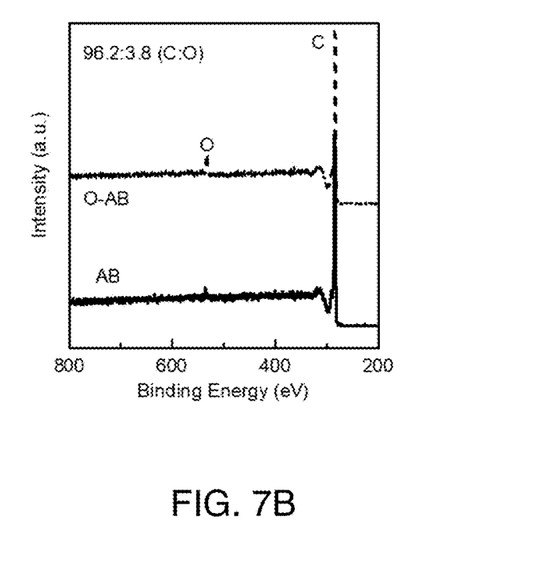
FIG. 7B shows XPS spectra of oxidized and non-oxidized AB carbon.

The oxygen content on the catalysts can be tuned by changing the process time for oxidation. Longer oxidation times gave rise to a gradual increase of oxygen content up to 9% within 48 hours. In FIGS. 4A-B, we plotted the oxygen content of each sample versus the current and the selectivity at 0.6 V, respectively. A nearly linear correlation was observed on both plots, further validating the importance of oxygen functional groups. To demonstrate the general efficacy of this surface oxidation strategy for ORR to produce $H_2O_2$, we examined two other types of low-cost carbon materials (SP and acetylene black, denoted as "AB") and found that the ORR activity and selectivity of the oxidized carbon materials (O—SP and O-AB, XPS spectra shown in FIGS. 7A and 7B, respectively) were both improved significantly or comparable in both basic and neutral electrolytes, as shown on FIGS. 4C-D. Notably, the O—SP and O-AB achieved selectivity of ~93% and ~72%, respectively, much higher than those for original SP and AB (~68% and ~30% for SP).

IId) DFT Calculations

The above experimental results demonstrate that the oxidation treatment of nanostructured carbons generates abundant oxygen functional groups, which may tailor the electronic structure of carbon materials and significantly modulate their oxygen reduction activity. Identification of active sites for this catalytic process is important for mechanistic understanding and for the rational design of future catalysts. Herein we employ DFT calculations to study the activities of a wide range of the oxygen functional groups (totaling 9 configurations) toward oxygen reduction reaction. A two-dimensional graphene sheet is used as the model system, where different types of oxygen functional groups including carboxyl (—COOM, M═H and Na for this calculation), carbonyl (C═O), etheric (O—C—O) and hydroxyl (—OH) were introduced at different locations of the graphene, e.g. basal plane and edge. The activity of a catalyst for the oxygen reduction reaction is determined to a large extent by its binding to all the ORR intermediates (OOH*, O and OH*). Thus, catalytic activities for the different structures are determined by the binding energies of the reaction intermediates to the active sites of the catalyst. For the two-electron oxygen reduction reaction, the overpotential is either due to hydrogenation of oxygen (eq. 1) or the reduction of OOH* to form hydrogen peroxide (eq. 2).

$$O_2 + H_2O + e^- \rightarrow OOH^* + OH^- \quad (1)$$

$$OOH^* + e^- \rightarrow HO_2^- \quad (2)$$

We use $\Delta G_{OOH^*}$ as a descriptor and plot the activity volcano to underline the activities of different oxygen functional groups. The limiting potential, $U_L$, which can be considered as a metric of activity, is defined as the lowest potential at which all the reaction steps are downhill in free energy. The theoretical overpotential is defined as the maximum difference between the limiting potential and equilibrium potential. These computations suggest that the —OH functional group does not significantly contribute to the oxygen reduction reaction. However, the C—O—C groups on the basal plane and at the edge of the (O Basal-1 and O Edge) graphene are highly active for the two-electron reduction of oxygen to hydrogen peroxide with overpotentials of 0.02 V and 0.06 V, respectively, comparable with the previously reported noble metal catalysts. Among different possible configurations for —COOM functional group, we find the armchair edge is the most active (COOM Edge-2), yielding an overpotential of 0.06 V.

III) Discussion

While XPS analysis was helpful in elucidating the different species of oxidized carbon in these materials, the ratios were very similar in all the oxidized samples; thus, it is challenging to experimentally confirm the active functional groups unequivocally. Here in order to support the DFT results that demonstrate the oxygen functional groups (—C—O—C and —COOM) are active and selective for electrochemical oxygen reduction to produce $H_2O_2$, we choose two different methods to fabricate oxidized CNTs which are rich in these two functional groups. It should be noted that the nanotube morphologies are mostly preserved after these two oxidation methods, thus the possible contribution from morphology change to the overall ORR activity can be excluded. The first method is oxidizing CNTs by highly concentrated KOH solution at high temperature (denoted as CNTs-KOH). According to the XPS results, the intensity of C═O bond was much higher than C—O bond, suggesting the formation of —COOH functional group on the surface. The broad peak at around 535 eV can be attributed to firmly absorbed $H_2O$. Thus, although the asmeasured oxygen content is ~8.5%, the oxygen content of the functional group should be much lower. The second method is oxidizing CNTs by mixing with poly (ethylene oxide) (PEO, mass ratio: 1:4) and carbonizing the mixture at 600° C. for 3 h (denoted as CNTs-PEO). The XPS results demonstrated that the C—O bond was dominate in CNTs-PEO, indicating the formation of —C—O—C functional group as the material was produced in high temperature. The oxygen content was ~4.3% for this material.

Figure 8A:
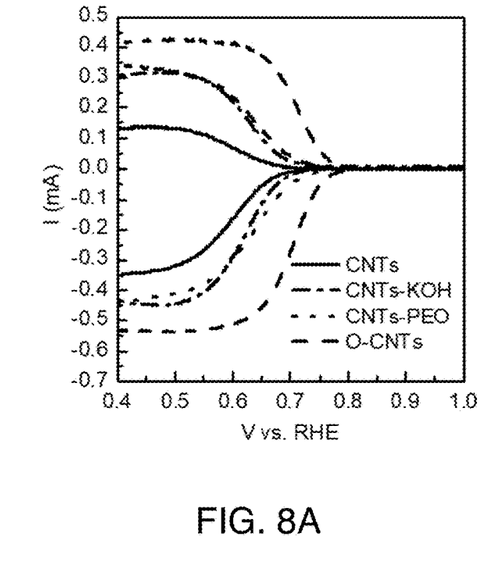
FIGS. 8A-B show polarization curves and selectivity for carbon nanotube catalysts oxidized by several different methods, and a control case of a non-oxidized carbon nanotube catalyst.
Figure 8B:
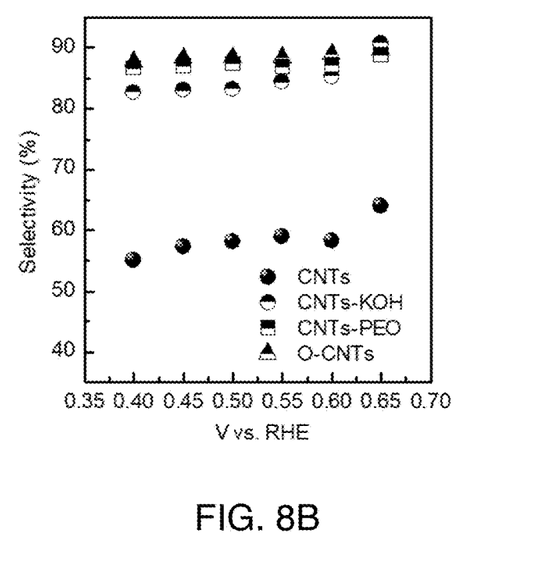

The electrochemical results of FIGS. 8A-B reveal that both CNTs-KOH and CNTs-PEO show significantly improved ORR activity and selectivity (~83% and ~87% for CNTs-KOH and CNTs-PEO, respectively), demonstrating that both functional groups are active sites for electrochemical reduction of oxygen to produce $H_2O_2$. Although the selectivity of both samples is comparable with O—CNTs, the lower onset potentials are observed. We hypothesize that the different onset potentials can be attributed to the possibility of the presence of different oxygen functional groups. According to our DFT calculations, the type of functional group is determinantal to the activity. It also seems to be a synergy effect between different functional groups. For example, O—CNTs catalyst show multiple oxygen functional groups, thus it is possible that the activity may be affected by several highly active functional groups. As only one oxygen functional group is dominated in CNTs-KOH and CNTs-PEO, the possible synergistic effect seems to be negligible. Moreover, the CNTs-PEO shows slightly higher activity than CNTs-KOH, indicating that the —C—O—C functional group is more active than —COOM group. Therefore, combined with our DFT calculation, we believe that the above results can further support the active sites of carbon materials for electrochemical $H_2O_2$ synthesis. Overall, this combination of DFT calculations to the controlled synthesis of carbon materials with variety of oxygen functional groups yields the fundamental understanding needed to provide guidance towards the design of future carbon-based catalysts for the electrochemical production of $H_2O_2$.

IV) Conclusions

In summary, a surface oxidation treatment was shown to enhance the activity and selectivity of carbon nanotubes (CNTs) towards $H_2O_2$ production by means of the oxygen reduction reaction. The oxidized carbon nanotubes (O—CNTs) drastically lowered the needed overpotential by ~130 mV at 0.2 mA compared to standard CNTs, while simultaneously increasing the selectivity from ~60% to ~90%. The ORR activity and selectivity were also examined as a function of oxygen content in the O—CNTs; a nearly linear correlation emerged that reflects the importance of oxygen functional groups in driving the catalysis. This surface oxidation approach was also effective for enhancing the ORR performance of other types of carbon materials, validating the generality of this strategy. Based on DFT calculations we can assign the origin of the high activity to the —COOH functional group in the armchair edge as well as the C—O—C functional group in the basal plane of the graphene, and these active functional groups are supported by further controlled experiments. We propose that our experimental observations as well as the theoretical calculations provide new insights for catalyst development that may be relevant in the production of industrial chemicals by means of clean, renewable electrical energy.

V) Methods

Va) Surface Oxidation of Carbon Materials.

Firstly, the predetermined quantities of raw CNTs (multiwall, 0.2 g) and nitric acid (12 M, 200 ml) were added into a three-necked, round-bottomed glass flask. Afterwards, the reaction flask equipped with reflux condenser, magnetic stirrer and thermometer mounted in the preheated water bath. The temperature was kept at 80° C. and the oxidized products were denoted as O—CNT-6, O—CNT-12, O—CNT-24 and O—CNT with the oxidizing time of 6, 12, 24, and 48 hours, respectively. After oxidation for a certain time, the slurry was taken out, cooling, centrifuged and washed with water and ethanol for several times to neutral pH. Finally, the sample was dried at 60° C. in a vacuum oven overnight. For SP and AB, the oxidation process is similar to that for CNTs (48 hours). The reduction of O—CNTs was performed in a tube furnace at the temperature of 800° C. for 2 h under a mixed $H_2(20\%)$/Ar atmosphere.

Vb) CNTs Oxidized by Other Methods.

We choose two different methods to oxidize the CNTs to preferentially creating different surface oxygen functional groups. One method is oxidizing CNTs by highly concentrated KOH solution in an autoclave. Briefly, a certain amount of CNTs (~50 mg) was firstly dispersed in 6 M KOH solution (40 ml). Afterwards, the suspension was transferred to an autoclave, which was sealed and put into an oven maintaining at 180° C. for 12 h. After reaction, the product was taken out, cooled down naturally, centrifuged and washed with water and ethanol for several times to neutral pH. Finally, the sample was dried at 60° C. in a vacuum oven overnight. The product was denoted as CNTs-KOH. Another method is oxidizing CNTs by mixing with poly (ethylene oxide) (PEO) (mass ratio: 1:4) and carbonizing the mixture at 600° C. for 3 h under argon atmosphere. The sample was denoted as CNTs-PEO.

Vc) Characterization

The size and morphology characterization of the samples were carried out using transmission electron microscopy (TEM, FEI Tecnai). X-ray photoelectron spectroscopy (XPS, SSI SProbe XPS spectrometer with Al(Ka) source) was used to determine the heteroatoms and functional groups. The X-ray powder diffraction patterns were recorded on an X-ray diffractometer (Rigaku D/max 2500) in the range from 20 to 60°. The Raman and UV-vis spectrum were conducted in HORIBA Scientific LabRAM and Cary 6000i, respectively.

Vd) Sample Preparation and Electrochemical Characterizations.

The electrodes were prepared by dispersing the oxidized products in ethanol to achieve a catalyst concentration of ~3.3 mg ml$^{-1}$ with 5 wt % Nafion. After sonication for 60 minutes, 6 µl of the catalyst ink was drop-dried onto a glassy carbon disc (area: 0.196 cm$^2$). The electrochemical tests were performed in a computer-controlled Biologic VSP potentiostat with a three-electrode cell at room temperature. The glass carbon electrode loaded with catalyst was used as the working electrode, a graphite rod and a saturated calomel electrode (SCE) were used as the counter electrode and reference electrode, respectively. Two electrolytes with pH-13 (0.1 M KOH) and ~7 (0.1 M PBS) were chosen in this study. The ORR activity and selectivity were investigated by polarization curves and rotating ring-disk electrode (RRDE) measurement in $O_2$ saturated electrolyte at a scan rate of 10 mV s$^{-1}$. The polarization curves in $N_2$ saturated electrolytes were also recorded as reference. Electrocatalytic $H_2O_2$ production on T-CFP loaded with O—CNTs (~2 mg·cm$^{-2}$) was performed in a two-compartment cell with Nafion 117 membrane as separator. Both the cathode compartment (25 mL) and anode compartment were filled with the same electrolyte (1 M KOH). The polarization curves were both IR-corrected.

$H_2O_2$ selectivity of the O—CNTs on RRDE was calculated from based on the current of both disc and ring electrodes (eq. 3). A potential of 1.2 V (vs. RHE) was applied on the ring of the working electrode at a 1600 rpm speed during the whole testing process.

$$H_2O_2 \text{ yield: } H_2O_2(\%) = 200 * \frac{I_R/N}{I_D + I_R/N} \qquad (3)$$

where $I_R$ is the ring current, ID is the disk current and N is the collection efficiency (0.256 after calibration).

Ve) $H_2O_2$ Concentration Measurement

The $H_2O_2$ concentration was measured by traditional cerium sulfate $Ce(SO_4)_2$ titration method based on the mechanism that yellow solution of $Ce^{4+}$ would be reduced by $H_2O_2$ to colorless $Ce^{3+}$ (eq. 4). Thus, the concentration of $Ce^{4+}$ before and after reaction can be measure by UV-vis. The wavelength used for the measurement is 316 nm.

$$2Ce^{4+} + H_2O_2 \rightarrow 2Ce^{3+} + 2H^+ + O_2 \qquad (4)$$

Therefore, the concentration of $H_2O_2$ (N) can be determined by (eq. 5):

$$N = 2 \times NCe^{4+} \qquad (5)$$

where $NCe^{4+}$ is the mole of consumed $Ce^{4+}$.

The yellow transparent $Ce(SO_4)_2$ solution (1 mM) is prepared by dissolving 33.2 mg $Ce(SO_4)_2$ in 100 mL 0.5 M sulfuric acid solution. To obtain the calibration curve, $H_2O_2$ with known concentration was added to $Ce(SO_4)_2$ solution and measured by UV-vis. Based on the linear relation between the signal intensity and $Ce^{4+}$ concentration (0.1~0.8 mM), the $H_2O_2$ concentrations of samples can be obtained. The concentration of $H_2O_2$ was also determined by using the commercial available hydrogen peroxide testing strip paper. $H_2O_2$ selectivity of the O—CNTs tested on T-CFP was determined by this method. The electrode was kept at the potential with an initial ORR current at ~20 mA cm² until a certain amount of charge (10 C) was accumulated.

Vf) Computational Study

The simulations are handled using the Atomic Simulation Environment (ASE). The electronic structure calculations are performed using QUANTUM ESPRESSO program package. The electronic wavefunctions are expanded in plane waves up to a cutoff energy of 500 eV, while the electron density is represented on a grid with an energy cutoff of 5000 eV. Core electrons are approximated with ultrasoft pseudopotentials. We use the BEEF-vdW exchange-correlation functional, which has been shown to accurately describe chemisorption as well as physisorption properties on graphene. Graphene structures are modeled as one layer. A vacuum region of about 20 Å is used to decouple the periodic replicas. To model oxygen functional groups in the basal plane we use super cell of lateral size 8×8, and the Brillouin zone is sampled with a (2×2×1) Monkhorst-Pack k-points. For the oxygen functional groups in the edge we use the super cell of lateral size 3×4 and the Brillouin zone is sampled with a (1×4×1) Monkhorst-Pack k-points.

Vg) Details of the Calculated Free Energy of Adsorptions.

We consider three intermediates in the oxygen reduction reaction (ORR), OH*, O* and OOH*. Catalytic activity of the material is determined by the binding energies of the reaction intermediates to the active sites of the catalyst.

To estimate the adsorption energies of different intermediates at zero potential and pH=0 we calculate the reaction energies of each individual intermediate and correct them for zero point energy (ZPE) and entropy (TS) using the following equation (eq. 6):

$$\Delta G = \Delta E + \Delta ZPE - T\Delta S \qquad (6)$$

Additionally, we use the computational hydrogen electrode (CHE) model, which exploits that the chemical potential of a proton-electron pair is equal to gas-phase $H_2$ at standard conditions, and the electrode potential is taken into account by shifting the electron energy by −eU where e and U are the elementary charge and the electrode potential, respectively. As the ground state of the $O_2$ and $H_2O_2$ molecules are poorly described in DFT calculations we use gas phase $H_2O$ and $H_2$ as reference states as they are readily treated in the DFT calculations. The entropy for $H_2O$ is calculated at 0.035 bar which is the equilibrium pressure of $H_2O$ at 300 K. The free energy of this state is therefore equal to that of liquid water.

The invention claimed is:

1. A method of electrochemical production of hydrogen peroxide, the method comprising:
   performing surface oxidation of a carbon precursor to provide a surface-oxidized carbon catalyst, wherein the surface oxidation is performed by mixing a nanostructured carbon precursor with poly (ethylene oxide) to produce a mixture and carbonizing the mixture;
   providing an electrochemical cell configured for the electrochemical production of hydrogen peroxide, wherein the surface-oxidized carbon catalyst is disposed on a working electrode of the electrochemical cell; and
   providing electrical current to the electrochemical cell to produce hydrogen peroxide.

2. The method of claim 1, wherein the carbon precursor comprises carbon nanotubes.

3. The method of claim 1, wherein the carbon precursor comprises carbon black.

4. The method of claim 1, wherein the surface oxidation produces oxygen functional groups on the carbon precursor.

5. The method of claim 4, wherein the oxygen functional groups include —C—O—C and —COOH.

6. The method of claim 1, wherein the surface-oxidized carbon catalyst has an X-ray photoelectron spectrum having an oxygen is peak.

* * * * *

UNITED STATES PATENT AND TRADEMARK OFFICE
CERTIFICATE OF CORRECTION

PATENT NO. : 11,168,403 B2
APPLICATION NO. : 16/221122
DATED : November 9, 2021
INVENTOR(S) : Yi Cui, Zhiyi Lu and Guangxu Chen It is certified that error appears in the above-identified patent and that said Letters Patent is hereby corrected as shown below:

In the Specification

Column 1, Lines 12-17:
GOVERNMENT SPONSORSHIP
This invention was made with Government support under contract DE-AC02-765 F00515 awarded by the Department of Energy. The Government has certain rights in the invention.

Should read:
-- GOVERNMENT SPONSORSHIP
This invention was made with Government support under contract DE-AC02-76SF00515 awarded by the Department of Energy. The Government has certain rights in the invention. --

Signed and Sealed this
Twenty-eighth Day of May, 2024

Katherine Kelly Vidal
*Director of the United States Patent and Trademark Office*